Jan. 26, 1965  A. SENKOWSKI ETAL  3,167,298
TRACTOR SEATS

Filed Dec. 19, 1962  2 Sheets-Sheet 1

INVENTORS
ALEXANDER SENKOWSKI
BRUCE L. COSH

By *Imrie & Smiley*
Attorneys

Jan. 26, 1965   A. SENKOWSKI ETAL   3,167,298
TRACTOR SEATS

Filed Dec. 19, 1962   2 Sheets-Sheet 2

INVENTORS
ALEXANDER SENKOWSKI
BRUCE L. COSH

By Imirie & Smiley
Attorneys

United States Patent Office 3,167,298
Patented Jan. 26, 1965

3,167,298
TRACTOR SEATS
Alexander Senkowski, Coventry, and Bruce Lionel Cosh, Kenilworth, England, assignors to Tractor Research Limited, Stow-on-the-Wold, England, a British company
Filed Dec. 19, 1962, Ser. No. 245,916
Claims priority, application Great Britain, Jan. 9, 1962, 842/62
4 Claims. (Cl. 248—420)

This invention relates to tractor seats.

Most tractors are provided with a seat the position of which is adjustable because short and tall drivers cannot be comfortably accommodated by a seat the position of which is fixed.

The known forms of adjustable tractor seats, however, have a number of disadvantages one of which is that before the position of the seat can be adjusted it is necessary to loosen some screws or bolts, and to again tighten them after seat adjustment, using a tool, such as a spanner, for this purpose. This is very inconvenient if such adjustment has to be effected one or more times a day.

A further disadvantage of the known forms of tractor seat is that adjustment of the position of the seat cannot be effected while the tractor is moving in order to alleviate fatigue to the driver caused by his occupation of a permanent seat position.

A still further disadvantage of the known seats is that when the position thereof is adjusted to accommodate a short driver the seat is usually very close to the steering wheel of the tractor, and to the operating levers, so that mounting and dismounting the tractor can be most uncomfortable to the driver.

Yet another disadvantage of the known seats is that when the position of the seat is adjusted to accommodate a driver of short or medium height, and use is made of the foot-boards provided for the driver, there is insufficient space between the steering wheel and the front edge of the seat to permit the driver comfortably to stand on the foot-boards.

It is also a disadvantage of some known forms of tractor seats that they cannot be tipped or inverted to give protection thereto against weather while the tractor is parked.

It is a main object of the present invention to provide a tractor seat which avoids the disadvantages mentioned above.

According to the invention there is provided a tractor seat comprising front and rear seat supports rigidly attachable in spaced relation to the frame of a tractor, a seat, and connecting elements movable respectively with the seat and integral with said supports and co-operating to permit free movement of the seat relative to the supports in horizontal and vertical planes, and location of the seat in any one of a number of predetermined positions thereof relative to the supports, said connecting elements at one end of the seat being separable to permit turning of the seat about the connecting elements at the opposite end of the seat at least partly to effect inverting of the seat, and at said opposite end of the seat a locking pin and a cam one of which is movable with the seat and the other stationary, said locking pin and cam being engageable one with the other during turning of the seat to maintain engagement between the connecting elements at said opposite end of the seat.

In order that the invention may be clearly understood one embodiment thereof will now be described, by way of example, with reference to the accompanying drawings, in which.

In the drawings like reference numerals denote like or similar parts.

Figure 2:
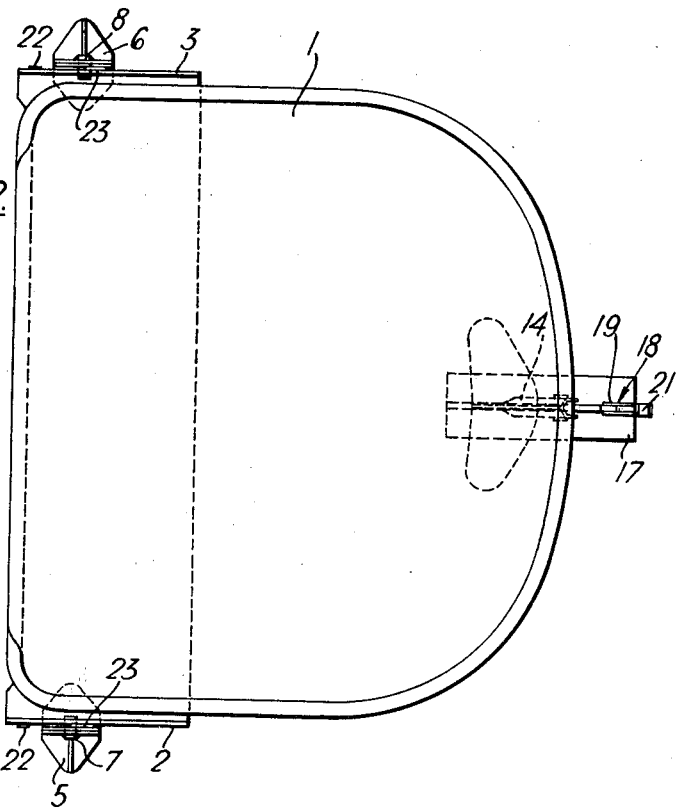
FIG. 2 is a top plan of FIG. 1.
Figure 3:
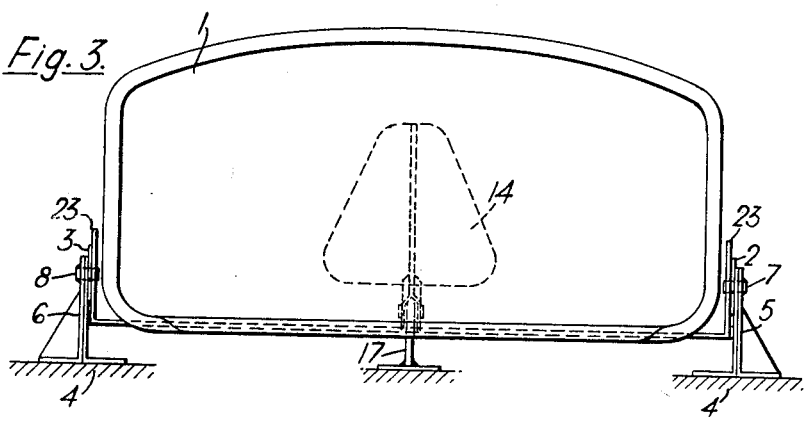
FIG. 3 is an end elevation of FIG. 1 looking in the direction of arrow A.

Referring to the drawings, the tractor seat 1 at the front end thereof has plates 2, 3, FIG. 2, secured, as by welding, to the opposite sides thereof. The plates 2, 3 form front connecting elements for connection to front guide members which are attachable rigidly, as by bolts or welding, to the frame 4 of a tractor. The front guide members comprise brackets 5, 6 having front locating pins 7, 8 which extend laterally therefrom and which project into slots formed in the plates 2, 3 and which extend lengthwise of the direction of movement of the seat in horizontal and vertical planes as described below.

Figure 1:
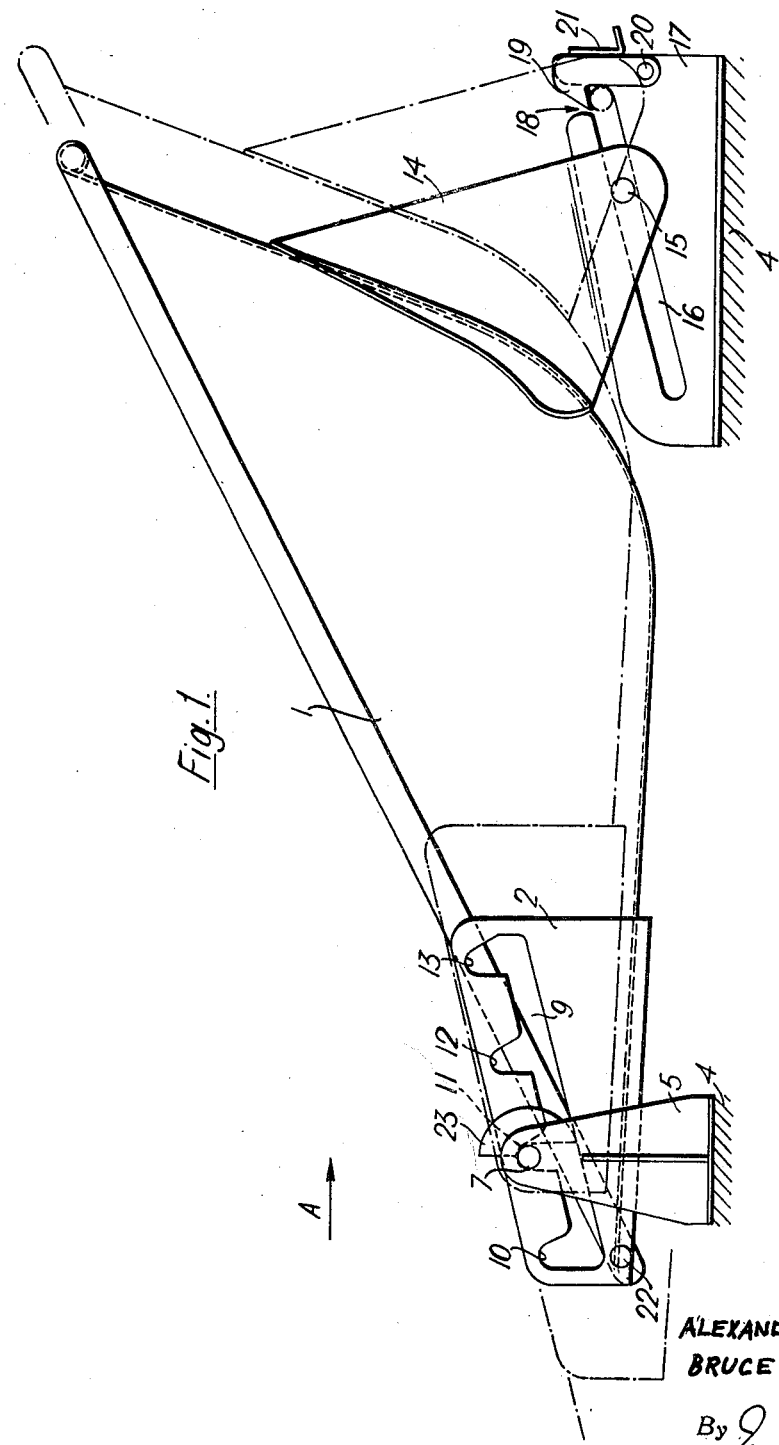
FIG. 1 is a side elevation of a tractor seat according to the invention.

The slot in each plate 2, 3 comprises a sloping portion 9, FIG. 1, from the upper edge of which a number of recesses 10, 11, 12, 13 open. These recesses determine a number of positions in any one of which the seat may be supported and retained by location of the front locating pins 7, 8 in the desired recesses.

Figure 4:
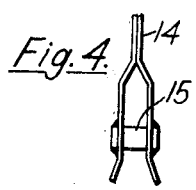
FIG. 4 illustrates a detail of the seat.

The rear end of the seat 1 has a bracket 14 secured thereto, as by welding, and this bracket has a forked end, FIG. 4, to which a rear locating pin 15 is secured. The locating pin 15 is normally located in a sloping slot 16, FIG. 1, formed in a rear guide member 17 which is also attachable rigidly to the frame 4 of the tractor. The slot 16 extends lengthwise of the above-mentioned direction of movement of the seat and slopes in the same direction as slot 9.

The pin and slot connection 15, 16 is a separable connection to permit turning of the seat 1 about the axes of the front locating pins 7, 8 for the purpose of at least partly inverting the seat as a protection against weather when the tractor is parked. To this end the slot 16 of the rear guide member 17 is open at the end 18 which is remote from the front guide members 5, 6 to permit removal of the rear locating pin 15 therefrom while the front locating pins 7, 8 are located in the foremost recesses 10 of the plates 2, 3. A latch 19 is pivoted at 20 to the guide member 17 and is urged by a spring 21 to the normal position thereof, as shown in FIG. 1, in which position the latch obturates the open end 18 of the slot 16 to prevent unintended displacement of the rear locating pin 15 from the slot 16.

Figure 5:
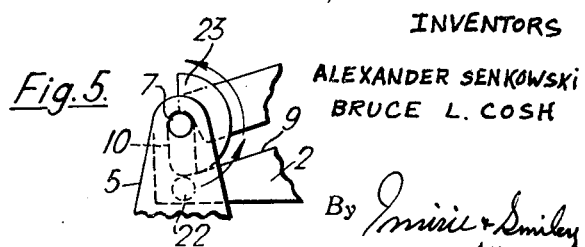
FIG. 5 illustrates a part of FIG. 1 with the positions of certain elements shown in positions thereof different from those which they occupy in FIG. 1.

To ensure that, during turning of the seat, the front locating pins 7, 8 do not become dislodged from the recesses 10 the front end of the seat is provided with lateral outwardly extending locking pins 22, which, when the front locating pins 7, 8 are located in the recesses 10, FIG. 5, and the seat is turned, counterclockwise as viewed in FIG. 1, are engaged with stationary cams 23 carried by the front guide members 5, 6 and which act to maintain the front locating pins 7, 8 against the closed ends of the recesses 10.

If, with the seat in the position shown in FIG. 1, it is desired to adjust the position of the seat all that is necessary is to raise the front end of the seat until the front locating pins 7, 8 are moved out of the recesses 11 into the downwardly sloping slot portions 9 and then either to slide the front locating pins 7, 8 downwards towards recesses 10 or upwards towards recesses 12 and 13 and to lower the seat so that desired recesses 10, 12, or 13 are disposed about the front locating pins 7, 8. This can be effected without the driver alighting from the tractor as it is necessary for the driver only to lift his weight from the seat so that on raising of the front end thereof the seat can slide easily guided by the slots 9 and 16. The fixed front locating pins 7, 8 are located at a higher level than that which is attained by the rear locating pin 15 even when the rear locating pin 15 is at the top of slot 16.

It will be seen from FIG. 1 that when the seat is moved lengthwise of slots 9 and 16 it is caused thereby to be moved simultaneously in horizontal and vertical planes. The guide members 5, 6, 7, 8 and 17 accordingly co-operate with the connecting elements 2, 3 and 14, 15 to support and retain the seat in any one of a predetermined number of positions thereof, four as shown in the drawings, relative to the guide members and no tools are required in order to effect adjustment of the position of the seat.

When the tractor is parked, the seat can be protected against weather by adjusting the seat, if necessary, so that the front locating pins, 7, 8 are located in the foremost recesses 10 when the seat will occupy the position indicated in broken lines in FIG. 1. Then one hand is used to release the spring-loaded latch 19 following which the rear end of the seat is raised by the other hand thus rotating the seat about the axes of the front locating pins 7, 8 and moving the rear locating pin 15 out of the open end 18 of the slot 16. On returning the seat to the operative position thereof the locking pins 22 by co-operation with the cams 23 ensure that the rear locating pin 15 is aligned with the slot opening 18 and the rear locating pin 15 cams the latch 19 clockwise, as viewed in FIG. 1, as it re-enters the slot 16.

It will be understood that, if desired, modifications may be effected to the seat as described above with reference to the drawings while retaining the general mode of operation thereof. Thus the seat may be modified by providing a single central front guide element 5, 7, and co-operating parts 22, 23 and a single plate 2 for co-operation with the single front locating pin 7. In this instance the seat is provided with two brackets 14 and rear locating pins 15 for co-operation with two rear guide members 17.

Alternatively, the locating pins 7, 8 may be carried by the seat frame and the slotted plates 2, 3 secured to the brackets 5, 6 in which event the recesses 10, 11, 12, 13 will extend downwards from the bottoms of the slots 9.

In a further alternative construction the slot formation of member 17 may be applied to the plates 2, 3 and the slot arrangement of plates 2, 3 applied to the member 17 but with the recesses 10, 11, 12, 13 extending downwards from the bottom of the slot.

As a still further modification the bracket 14 and locating pin 15 may be replaced by a member similar to member 17 and the bracket 14 and locating pin 15 be secured to the tractor frame 4.

We claim:

1. A tractor seat comprising front and rear seat supports rigidly attachable in spaced relation to the frame of a tractor, a seat, connecting elements movable respectively with the seat and integral with said supports and co-operating to permit free movement of the seat relative to the supports in horizontal and vertical planes and location of the seat in any one of a number of predetermined positions thereof relative to the supports, said connecting elements at one end of the seat being separable to permit turning of the seat about the connecting elements at the opposite end of the seat at least partly to effect inverting of the seat, and at said opposite end of the seat a locking pin and a cam one of which is movable with the seat and the other stationary, said locking pin and cam being engageable one with the other during turning of the seat to maintain engagement between the connecting elements at said opposite end of the seat.

2. A tractor seat comprising a seat, two front seat supports rigidly attachable to the frame of a tractor to be disposed on opposite sides of the seat at the front end thereof, connecting plates secured to opposite sides of the front end of the seat and each provided with a sloping slot extending lengthwise of the seat and with recesses spaced apart lengthwise of the slot and opening from the upper longitudinal edge thereof, a front locating pin extending from each of the front seat supports and located one in each of said slots, a rear seat support rigidly attachable to the tractor frame and provided with a sloping slot extending lengthwise of the seat, each of said slots sloping at the same angle and in the same direction, a rear locating pin carried by a bracket secured to the rear of the seat and located in the slot in said rear seat support, that end of the slot in the rear support which is remote from the front supports being open to permit removal of the rear locating pin from the slot by turning of the seat about the axes of the front locating pins, and a spring-loaded latch operable normally to obturate the opening through which the rear locating pin is moved out of and returned into the slot.

3. A tractor seat according to claim 2, including locking pins and cams said locking pins and cams being carried by the front seat supports and the front end of the seat for relative movement and co-operating during turning of the seat about the axes of the front locating pins to prevent dislocation of the front locating pins from the recesses in which they are located during turning of the seat.

4. A tractor seat according to claim 2, including a cam secured to each of said front seat supports, and locking pins carried by the front end of the seat, said locking pins co-operating with said cams during turning of the seat about the axes of the front locating pins to prevent dislocation of the front locating pins from the recesses in which they are located during turning of the seat.

References Cited in the file of this patent

UNITED STATES PATENTS

| | | |
|---|---|---|
| 2,170,923 | Jacobs | Aug. 29, 1939 |
| 2,745,616 | Gomes | May 15, 1956 |
| 2,809,690 | Walther et al. | Oct. 15, 1957 |
| 3,006,593 | Plate et al. | Oct. 31, 1961 |